June 6, 1944.   G. A. PAULSEN   2,350,415
GAUGE HOLDER
Filed Feb. 16, 1943
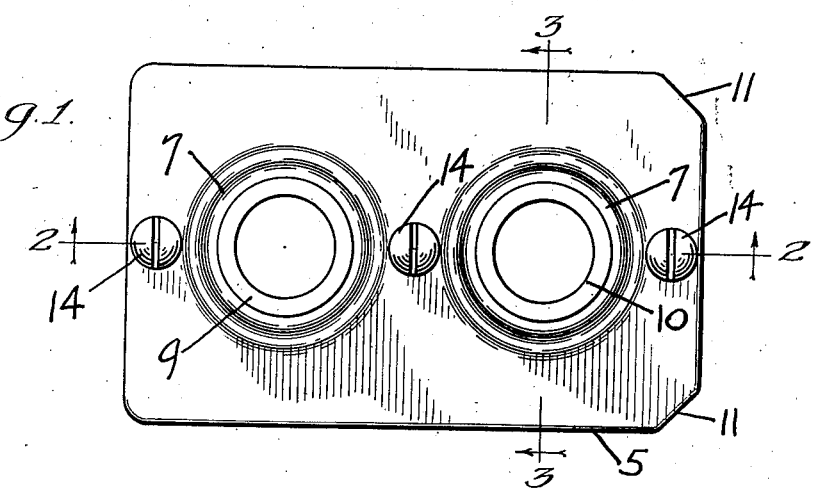
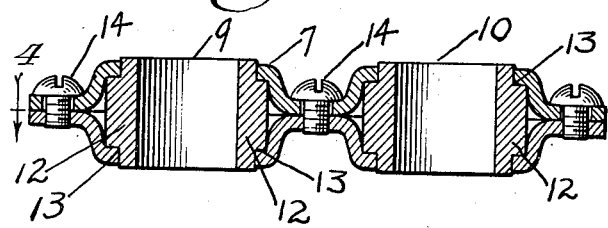
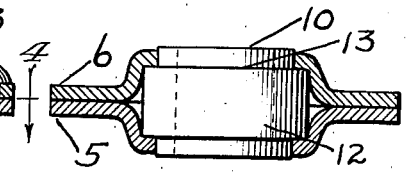
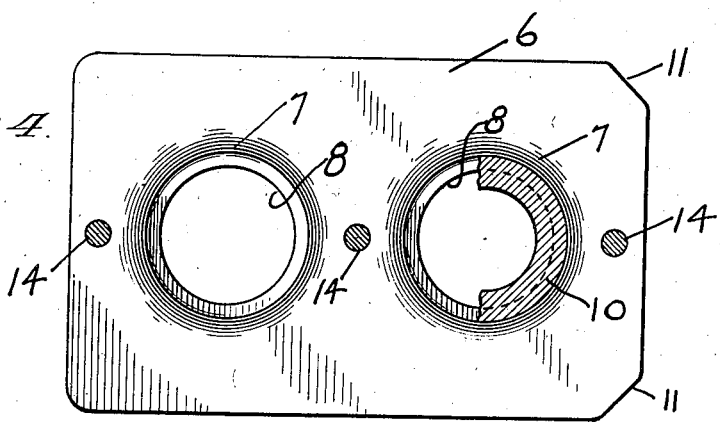
Inventor:
George A. Paulsen
By: Harold Olsen
Attorney Patented June 6, 1944

2,350,415

UNITED STATES PATENT OFFICE 2,350,415

GAUGE HOLDER

George A. Paulsen, Chicago, Ill., assignor to Northern Tool & Die Co., Chicago, Ill., a corporation of Illinois Application February 16, 1943, Serial No. 476,095

4 Claims. (Cl. 33—178)

This invention relates to gauge holders and, more particularly, to holders for hollow gauges, such as ring gauges and the like.

Usually, ring gauges are mounted in a plate or block of metal or other suitable material which serves as the mounting for the gauge as well as the equivalent of a handle by which the operator holds the gauge while performing his task. Often such ring gauges are mounted in pairs in such plates or blocks, the rings being of slightly different inside diameter so that the object to be gauged, if properly made, will pass through one of the rings and not through the other. Such a gauge is usually called a twin ring gauge.

Gauge holders of the kind described are usually made of a single relatively thick metal plate or block which is provided with one or more openings (depending upon the number of gauges it is designed to hold) and these openings must be very accurately machined. Usually, the plate or block is split between the openings, thus giving it some flexibility or resiliency, and some form of set screw is employed to draw the separated parts of the plate together, thus clamping the gauges which are mounted in the openings.

Such gauge holders, as above described, are not only expensive because they require many accurately machined operations but they have the great disadvantage that, when the gauges are assembled and the set screw is tightened up, radial pressure is applied to the gauges with the result that often the gauges are slightly distorted and, therefore, rendered useless for their intended purpose. Moreover, it is difficult to assemble the gauges in such holders and to replace them when it becomes necessary.

My invention provides a gauge holder of simple and inexpensive construction having the great advantage that the securing force is applied axially of the gauge instead of radially, thereby obviating the danger of distorting the gauge.

My holder is made of two plates of relatively light metal, or other suitable material, which can be formed and punched out in a single operation on any ordinary die press, thus eliminating costly machining operations.

With my holder, I provide a gauge having a central part of its wall of substantially greater thickness than its ends, thereby providing circumferential shoulders to cooperate with the plates of the holder and to receive the clamping force when the plates are drawn together.

Thus, my gauge holder is a simple, inexpensive, substantial structure in which it is a very simple matter to assemble the gauges and to replace them whenever it is necessary or desired.

To make my invention clear, I have illustrated it, by way of example, as applied to a twin ring gauge such as is used in ammunition plants, or the like, for gauging the outside diameter of cartridge cases, shells, or similar articles. But, as will readily be understood, by those skilled in the art, the invention may be embodied in various other forms of gauge holders for other forms of gauges. It is to be understood, therefore, that I do not limit myself to the form of gauge which is herein described merely as a suitable example, nor to the precise details of the holder for the gauge. Such details, obviously, are subject to variation without departing from the spirit of my invention and the scope thereof as defined in the appended claims.

In the accompanying drawing:

Fig. 1 is a plan view of a gauge holder embodying my invention;

Fig. 2 is a sectional view taken substantially on line 2—2 of Fig. 1;

Fig. 3 is a sectional view substantially on line 3—3 of Fig. 1, but showing the gauge in elevation; and Fig. 4 is a plan view of the inside of the lower plate as seen on line 4—4 of Fig. 2, part only of one of the gauges being shown in section.

My gauge holder comprises a pair of plates, 5 and 6, which may be made of metal or of any other suitable material and which may be of any desired size or configuration. Whatever design may be adopted, the plates should be identical in size and shape, so that they may be superposed when the holder is assembled as shown in the several views in the drawing.

The plates 5 and 6 are provided with similar but oppositely extending raised portions or bosses 7 which, as illustrated in this assembly, are of substantially circular configuration. Each of the raised portions or bosses is provided with a generally circular aperture 8. It is to be understood, of course, that where gauges of different configuration are to be supported in the holder, the said apertures will have the same configuration as the gauges.

The arrangement thus far described is such that when the plates 5 and 6 are properly assembled, as shown in the drawing, the bosses or projecting portions 7 are juxtaposed and their respective openings 8 are in registry. It is also seen that the oppositely extending bosses or projections 7 form a chamber or space in which the gauges are held, with the ends of the gauges seated in the registering openings.

The gauges illustrated by way of example are indicated by the reference numerals 9 and 10. They are substantially identical except that, if desired, the gauge 10 may be of slightly smaller inner diameter than the gauge 9. When the gauges are thus arranged in pairs of different diameter, the object to be gauged, if properly made, should not pass the gauge 10 but should pass the gauge 9. Suitable wording may be impressed on one or both of the plates to indicate which gauge is the smaller. For example, the words "not go" or "no go" may be impressed on the plates adjacent the smaller gauge 10 and the word "go" adjacent the larger gauge 9. Also, the corners of the plates 5 and 6 may be cut off as indicated at 11 to serve as a guide or indication to the operator that the adjacent gauge is the smaller one, or the larger one, as the case may be. The cut off corners also enable the operator to place the gauges properly in the plates when the assembly is first made and also when the gauges are to be replaced.

Each of the gauges 9 and 10 comprises a hollow cylindrical body, the inner surface of which is very accurately ground to a predetermined diameter throughout its length. But instead of being of uniform thickness throughout, as is usually the case, my gauges have a centrally located portion 12 of greater thickness than the end portions, thus forming circumferentially extending shoulders 13.

As is seen particularly in Figs. 2 and 3, the shoulders 13 on the gauges contact the inner surface of the raised portions 7 on the plates 5 and 6. When the structure is assembled, suitable threaded fastening elements, such as the screws 14, pass through the flat parts of the plates 5 and 6 and when these screws are tightened up, the plates are brought firmly together and the raised parts or bosses 7 firmly embrace and press upon the shoulders 13 of the gauges. Thus, it is seen that the force applied when the gauges are assembled in the holder is transmitted axially or longitudinally of the gauges as distinguished from radially or transversely, as is the usual case.

Thus, my gauge holder obviates one of the most serious defects of gauge holders as heretofore constructed. As above stated, the holders that I know of and which are quite generally in use are so arranged that when the securing force is applied, it is transmitted radially or transversely of the gauges. Because the gauges are of hollow construction, there is a danger that force so applied will tend to distort the gauges. Obviously, a gauge that in this way becomes inaccurate is perfectly useless. And when it is considered that these gauges are employed to determine dimensions to within a very small number of thousandths of an inch, any distortion of the gauge opening is fatal. By my arrangement, where the securing force is applied axially or longitudinally, there is no possibility of distortion of the inner diameter of the gauge.

It will thus be seen that I have provided a gauge holder of very simple and inexpensive construction and in which the gauges may be easily assembled initially, and as easily replaced when necessary. All that needs to be done is to place the gauges in the openings 8 in one of the plates, superpose the other plate, and draw up the screws 14. These screws may be drawn up as tightly as possible and yet there is no danger that the force applied will distort the gauges.

It will also be understood that my invention may be applied to other forms of gauges than the ring type which has been described as an example. Whatever the configuration of the gauge, the plates and their openings will be designed to accommodate them but in every case shoulders will be provided to receive the securing pressure when the plates are assembled.

I claim as my invention:

1. A gauge holder comprising a pair of superimposed plates, oppositely directed bosses on said plates provided with apertures, and means for drawing said plates together.

2. In combination, a gauge holder comprising a pair of plates, oppositely extending raised portions on said plates provided with registering openings, a gauge having a relatively thick central part located between said raised portions and having relatively thinner end parts extending through said openings, and means for drawing said plates together and applying pressure axially of said gauge.

3. In combination, a gauge holder comprising a pair of superimposed plates, a plurality of oppositely extending raised portions on each of said plates adapted to register when the plates are put together and to form a chamber therebetween, said raised portions being provided with registering openings, a gauge in each of said chambers having a relatively thick central part and relatively thinner end parts extending through said openings, and means passing through the flat parts of said plates for drawing said plates together and applying axial pressure to said gauges.

4. In combination, a gauge holder comprising a pair of superimposed plates, oppositely extending raised portions on said plates forming a chamber, a gauge in said chamber, and means for drawing said plates together and applying pressure axially of said gauge.

GEORGE A. PAULSEN.